US006885886B2

(12) United States Patent
Bauch et al.

(10) Patent No.: US 6,885,886 B2
(45) Date of Patent: Apr. 26, 2005

(54) METHOD AND SYSTEM FOR VISUALIZING A BODY VOLUME AND COMPUTER PROGRAM PRODUCT

(75) Inventors: Thomas Bauch, München (DE); Nils Frielinghaus, Geretsried (DE)

(73) Assignee: BrainLAB AG, Kirchheim (DE)

( * ) Notice: Subject to any disclaimer, the term of this patent is extended or adjusted under 35 U.S.C. 154(b) by 428 days.

(21) Appl. No.: 10/108,756

(22) Filed: Mar. 27, 2002

(65) Prior Publication Data

US 2002/0183607 A1 Dec. 5, 2002

Related U.S. Application Data

(63) Continuation-in-part of application No. 09/859,697, filed on May 17, 2001, now abandoned.

(30) Foreign Application Priority Data

Sep. 11, 2000 (DE) .......................................... 100 44 801
Sep. 11, 2001 (DE) .......................................... 101 44 630

(51) Int. Cl.$^7$ .............................. A61B 5/05; G06K 9/00
(52) U.S. Cl. ..................................... 600/416; 382/100
(58) Field of Search ................................ 600/416, 411, 600/410, 407, 436; 324/307, 308, 309, 310–315; 382/100, 154, 103

(56) References Cited

U.S. PATENT DOCUMENTS

| 5,031,620 | A |   | 7/1991 | Oe |
|---|---|---|---|---|
| 5,335,173 | A |   | 8/1994 | Sasahara |
| 5,961,454 | A |   | 10/1999 | Kooy et al. |
| 6,016,439 | A |   | 1/2000 | Acker |
| 6,072,889 | A | * | 6/2000 | Deaett et al. ................ 382/103 |
| 6,370,260 | B1 | * | 4/2002 | Pavlidis et al. ............. 382/103 |
| 6,490,476 | B1 | * | 12/2002 | Townsend et al. .......... 600/427 |

OTHER PUBLICATIONS

R.C. Gonzalez et al., "Digital Image Processing", Addison-Wesley Publishing Company, 1992, pp. 10–17, 185–189, 195–198.

* cited by examiner

Primary Examiner—Daniel Robinson
(74) Attorney, Agent, or Firm—Renner, Otto, Boisselle & Sklar, LLP

(57) ABSTRACT

A method for visualizing a body volume, and a computer program product and a system for carrying out the method, wherein the method includes the steps of establishing a criterion for each pixel of a selected data set for whether or not the pixel is assigned to an image background; calculating a synthesized representation from at least two selected diagnostic data sets which are not identical, excluding the pixels assigned to an image background, the selected diagnostic data sets having a predefined spatial allocation with respect to each other; calculating each of the data values of the synthesized representation as a mathematical function of at least one data value of each of the selected data set; and displaying the synthesized representation of a data set whose data values represent the body volume two- or three-dimensionally on a display unit.

27 Claims, 7 Drawing Sheets

METHOD AND SYSTEM FOR VISUALIZING A BODY VOLUME AND COMPUTER PROGRAM PRODUCT

RELATED APPLICATION DATA

This application is a continuation-in-part of U.S. application Ser. No. 09/859,697, filed May 17, 2001 now abandoned, which is hereby incorporated herein by reference.

BACKGROUND OF THE INVENTION

1. Field of the Invention

The present invention relates to a method and a system for visualizing a body volume, in particular two- or three-dimensionally, and in particular a body volume of a human being or animal, as well as to a computer program product comprising software code portions for implementing the method in accordance with the invention.

In medical diagnostics, therapy and surgery, precise two- or three-dimensional representations of body volumes are necessary. To capture data representing the body volumes, diverse non-invasive methods of diagnosis, for example computer tomography (CT) and magnetic resonance imaging (MRI), are available. The captured data are usually digitized and subjected to image processing on a computer to visualize them. The processed image data can then be displayed two- or three-dimensionally on a monitor screen, where the image may also be rotated in three-dimensional space.

Each of the known methods of diagnosis is tailored to displaying a specific kind of tissue. For example, bone structures can be resolved particularly well by computer tomography, vascular structures can be resolved particularly well by CT angiograph methodology, and hydrogenous tissue can be resolved particularly well by MRI. Thus, only a specific kind of tissue can be resolved particularly well in a two- or three-dimensional visualization of a data set captured by means of a method of diagnosis.

However, the human body consists of various kinds of tissue. Thus, for an in-depth diagnosis two- or three-dimensional visualizations captured by various methods of diagnosis must be compared with each other visually, which is laborious and results in inaccuracies in diagnosis.

2. Description of the Related Art

U.S. Pat. No. 5,335,173 discloses an image display method for medical diagnosis, in which two different data sets, captured by different methods of diagnosis and offering a particularly good resolution of a bone structure and a skin structure respectively, are displayed three-dimensionally. For improved diagnosis, a specific portion can be selected on a monitor screen displaying slice images through a three-dimensional body volume. In the selected portion of the image, the data set which represents bone structures particularly well is replaced by the data set which represents skin structures particularly well, or vice-versa. Thus, in the selected image portion, preselected image data are replaced by the corresponding data of another data set. Even exchanging image information fails to increase the accuracy and information content of the diagnosis substantially.

SUMMARY OF THE INVENTION

It is the object of the present invention to provide a method and system for two- or three-dimensionally visualizing a body volume, wherein an even higher information content and an even higher accuracy in diagnosis is possible.

This object is achieved by a method in accordance with the invention as set forth in claim 1, by a system in accordance with the invention as set forth in claim 14, and by a computer program product as set forth in claim 13. Advantageous embodiments are the subject matter of the related subclaims.

In accordance with a first aspect of the present invention, a method for visualizing a body volume is provided, in which a data set whose data values represent the body volume is displayed two- or three-dimensionally on a display, the method comprising computing a synthesized data set and/or synthesized representation from at least two selected diagnostic data sets which are not identical and which have a predefined spatial allocation or relationship with respect to each other, wherein each of the data values of the synthesized data set is computed as a mathematical function of at least one data value of each of the selected data sets, and the synthesized data set is displayed on the display.

In principle, a plurality of different mathematical functions can be used to synthesize the new data set, combining the data values of two, or more than two, data sets, preferably on a one-to-one basis, into a new data value in each case. Examples of such mathematical functions are known from the prior art, in connection with image processing or imaging. The mathematical function employed in each case can assign a data value of the synthesized data set to each data value of the at least two selected data sets. The mathematical function can alternatively also assign each of a plurality of data values of the at least two selected data sets to each single data value of the synthesized data set, such that the image data as a whole can be compressed.

Advantageously, the synthesized data set and/or synthesized representation in accordance with the invention comprises image information from both the first selected data set and from the second selected data set, as well as from any other selected data set. Thus, a synthesized data set capable of combining the benefits of each of the selected data sets can be produced in accordance with the present invention by suitable image processing of one or more of the selected data sets and suitably synthesizing the image information thus processed.

In accordance with a particularly preferred embodiment of the invention, respectively different methods of diagnosis are used to capture the selected data sets. These different methods of diagnosis may be particularly well suited for resolving different tissue structures. Thus, visualizing the synthesized data set two- or three-dimensionally in accordance with the present invention may also combine the benefits of the respective methods of diagnosis used. It is of particular advantage that visualizing in accordance with the present invention comprises more varied image information and more detail accuracy, such that the accuracy of the diagnosis and also the information content of the image information can be increased.

For example, a CT (computer tomography) method may be used for capturing a first selected data set, by which method bone structures can be particularly well resolved, and an MR (magnetic resonance) method may be used for capturing the second selected data set, by which method hydrogenous tissue structures can be particularly well captured. By suitable image processing of one or more of the selected data sets and/or the synthesized data set, the data originating from the first selected data set, for example, may be particularly highlighted in the synthesized data set at the expense of the data originating from a second selected data set, as detailed in the following. The detail accuracy in visualizing the tissue structure is thus increased. Since for visualizing in accordance with the present invention, the selected data set which is based on the CT method can also be used for synthesizing the image data to be displayed, the synthesized data set can show both the bone structure and the tissue structure in particularly accurate detail and with a high information content, given suitable preparation of the data sets.

In principle, more than two selected data sets, each captured by a different method of diagnosis, may also be synthesized into a data set in accordance with the invention, said data set displaying for example more than two different tissue or bone structures. For synthesizing the synthesized data set in the aforementioned example, for instance, PET (positron emission tomography) data can be processed in addition to the CT and MR data, and displayed collectively.

The selected data sets have a predefined spatial orientation relative to each other, to ensure locationally accurate overlaying of the data in the synthesized data set. The selected data sets are preferably composed or processed beforehand, such that the data values of the data sets are spatially orientated in the same way. This may be achieved by composing or processing the data produced by the method of diagnosis accordingly. The spatially allocation of the respective data values of the selected data sets may, however, also be achieved by computing within the framework of synthesizing the synthesized data set. In this way, distortions of the image, such as may be due for example to the respective method of diagnosis used, can also be corrected. MR data, for example, are often distorted in the outer regions of the volume.

In accordance with a further embodiment in accordance with the invention, at least two of the selected data sets may also be computed by different image processing means from one and the same original or source data set, by means of different image processing parameters. This original data set is captured by one and the same method of diagnosis. For graphically displaying a body volume, an original data set typically needs to be graphically composed, for which image processing parameters need to be defined. Advantageously, different details in tissue structures can be highlighted particularly well by variably selecting these image processing parameters with one and the same original data set, and displayed together. Thus, in accordance with the invention even a single method of diagnosis may suffice for examination, where otherwise two or more methods of diagnosis would have been required. Further advantageously, the synthesized data set can highlight at least two different details in a tissue structure at the same time.

Expediently, the captured data sets may be captured prior to visualization and buffered on suitable data recording media. Thus, the image data can be subsequently read, for example by a data processing means, suitably composed or processed and visualized three-dimensionally, for example by an additionally consulted physician. In accordance with the present invention, however, one, more or all of the captured data sets may be captured in real time during visualization and, if necessary, additionally synthesized with buffered data sets into a new data set. Advantageously, it is possible in accordance with the invention to work in real time conditions. Information obtained during visualization, which makes changing the capture parameters of the method of diagnosis seem advantageous, for example changing the relevant capture parameters in an ultrasound diagnosis, may be applied directly and in real time in accordance with the invention, and the result displayed on the display. The accuracy of diagnosis and the image information content can thus be increased even further.

In synthesizing, it is particularly preferable to subtract and/or add the image information of two respectively selected data sets from/to each other. When employing, for example, a CT method and an MR method for capturing two selected data sets, then by subtracting the two selected data sets from each other, both the image information concerning the bone structure and the image information concerning hydrogenous tissue can be visualized together particularly well and accurately detailed. A preferred example in accordance with the invention involves the collective 2D or 3D display of brain and cranium masses. For computing the synthesized data set, however, any other method or computer algorithm known from prior art for image synthesis may in principle be used.

Optimally displaying data sets graphically, which have been captured by means of different methods of diagnosis, usually necessitates using various image display parameters.

It is thus particularly advantageous for the image to be processed and displayed by means of preset parameters, tailored to the methods of diagnosis used in each case to capture a selected data set or to highlight certain tissue structures in a selected data set. In this way, the image information of the selected data set used in each case can be displayed particularly well, without any further computing or setting steps. It is particularly preferable to use at least one parameter for image processing or imaging which influences the color and/or opacity allocation of the intensity values of the data sets. Image processing parameters are also known from the prior art which influence other graphic properties of the data sets.

For example, the preset parameter may influence a threshold value which once violated or exceeded assigns an item of brightness or color value information, or otherwise a background value having a constant, defined intensity and color rendering, to an image data value. Or the parameter may influence an image gradient, such that differences between adjacent pixels can be translated into different image gradients. Furthermore, the preset parameter may also be used to influence the opacity, the color rendering used for each selected data set, or further suitable items of image information, to adapt these to the respective image display desired or to the respective underlying methods of diagnosis. It is particularly advantageous if the preset parameters used can also influence some or all of the desired items of image information.

Preferably, the aforementioned parameters used for processing or displaying the image may also be determined manually or automatically. Expediently, processing and visualizing the image is initially undertaken by means of preset parameters, and the parameters are changed as required, for example when specific details of the three-dimensional visualization need to be highlighted in particular. For this purpose the parameters may be changed manually. The operator is able to recognize the imaging result by way of the display, and to change the parameters until the image display is expedient. In this arrangement, the imaging result may be visualized three-dimensionally, whereby the three-dimensional visualization can also preferably be rotated in three-dimensional space, or displayed as a predefined two-dimensional slice image through the body volume, wherein the location of the slice through the body volume may preferably be given, e.g. by the operator. In this way, the operator is able to directly affect visualization and optimize the parameters, in order to achieve optimal detail accuracy in visualization and optimal image information.

In accordance with the invention, however, the parameters may also be automatically optimized, by means of an optimization method, various kinds of which are known from the prior art. Preferably, the operator is thereby able to define the image information for which display is to be optimized, for example the bone structure or the vascular structure in the body volume, or a specific slice image or body part volume.

It is particularly preferable to apply a threshold value formation to the pixel of each selected data set, as follows: an intensity value or color value is assigned to those pixels whose intensity is above a threshold value. A background image value is defined, for example with a defined color and/or intensity, for those pixels whose intensity is below the defined threshold value. The pixel values of a selected data set above the threshold value are multiplied by a factor, a so-called transparency. The assigned pixel of a selected data set is multiplied by a complementary value of the factor which is decisive for the first selected data set. The pixel values multiplied by the respective transparency factor are added up pixel-for-pixel. The transparency factor can expediently be defined, for highlighting desired tissue structures. In image synthesis, the background pixels are adopted into the synthesized representation as background image values with the intensity or color value for background. In the synthesized representation, objects—e.g. tissue structures—can be superimposed onto the background values.

It is particularly preferable to display the data in the synthesized data set, these stemming from various selected data sets, i.e. being captured by means of various methods of diagnosis or derived from one and the same original data set by the use of various image processing parameters, in various colors. Advantageously, the various structures, for example bones, vascular or tissue structures, permit direct recognition. This has proven particularly advantageous in border or transition areas between differing tissue structures.

In visualization, the brightness of the various color values used, as assigned to the selected data sets, can be varied with time, for example periodically, continuously or periodically cycled so that contrasts between different structures can be perceived directly in sequence from various differences in brightness.

Three-dimensional visualizations of each of the selected data sets and/or two-dimensional slices through the body volumes are preferably displayed on the display in addition to the two- or three-dimensional visualizing of the synthesized data set, in particular axially, sagittally or coronally. Advantageously, both the synthesized image information in which individual tissues are highlighted in particular and the data set selected in each case may be displayed within a restricted space; in a first segment of the display, for example, data stemming from a CT image, and in another segment, data stemming from an MRI method, and in another segment, data stemming from a PET method, in another segment the synthesized data, etc.

Each visualization displayed on the display can preferably be freely rotated in three-dimensional space, individually and independently of any other visualization, for example by operating a trackball or other operational control. It is particularly preferred if parts of the body volume can also be displayed in definable magnification and three-dimensional orientation.

The data sets employed can in principle be captured by any method of medical diagnosis suitable for the three-dimensional display of body volumes. Particularly preferred for use in capturing data sets are the following methods: CT, CT-A, MRI, MR-A (magnetic resonance angiograph methodology), functional MRI or FMRI, PET (positron emission tomography), MEG (magnet encephalography), SPECT and ultrasound. However, the invention is not restricted to the aforementioned methods.

In accordance with a farther aspect, the present invention comprises a computer program product, directly loadable into the RAM of a digital computer and comprising software code portions for implementing the aforementioned steps in the method when the product is run on a computer. The computer program product may be stored on any data recording media, for example magnetic or magneto-optical disks, tapes, etc., or can be loaded via a network or the Internet. In particular preference, the computer program product can also be used by several computers at the same time.

In accordance with a farther aspect, the present invention comprises a system for two- or three-dimensional visualization of a body volume, including a data processing means for computing a synthesized data set from at least two selected diagnostic data sets which are not identical and have a predetermined spatial allocation or relationship with respect to each other, such that the data values of the synthesized data set are each computed as a mathematical function of at least one data value of each of the selected data sets, and also including a display for displaying the synthesized data set whose data values represent the body volume two- or three-dimensionally.

A means may be provided for inputting the selected data sets into the data processing means. The input means may be a typical data interface with external data storage means, for loading buffered data sets into the system, or at least one input means may be coupled to a medical diagnosis apparatus, to capture a data set such that the system in accordance with the invention can then also be operated in real time.

The at least two selected data sets may be selected by means of a menu control, for example manually by means of a computer program selecting the data sets on the basis of defined parameters, in particular automatically, or in some other way.

The system is preferably designed as a commercially available work station, the aforementioned means preferably being realized in the form of software. The aforementioned steps in the method are also preferably realized in the form of software, or software modules or software code portions.

The synthesized data sets and/or the selected data sets and/or slice images obtained from the selected data sets are preferably displayed at predetermined points on a display, such that the operator has extensive image information and options for diagnosis at his disposal, in a compact form.

The system in accordance with the invention may also be realized as a module in a typical system for capturing data sets with the aid of an imaging method of diagnosis, for example in a computer tomograph, whereby the other selected data set or sets can then be transferred from a data storage or a network.

BRIEF DESCRIPTION OF THE DRAWINGS

The invention will now be described by way of example and with reference to the attached drawings, in which.

Identical reference numerals in the drawings denote identical or equally acting elements or steps in the method.

DESCRIPTION OF THE PREFERRED EMBODIMENTS

Figure 1:
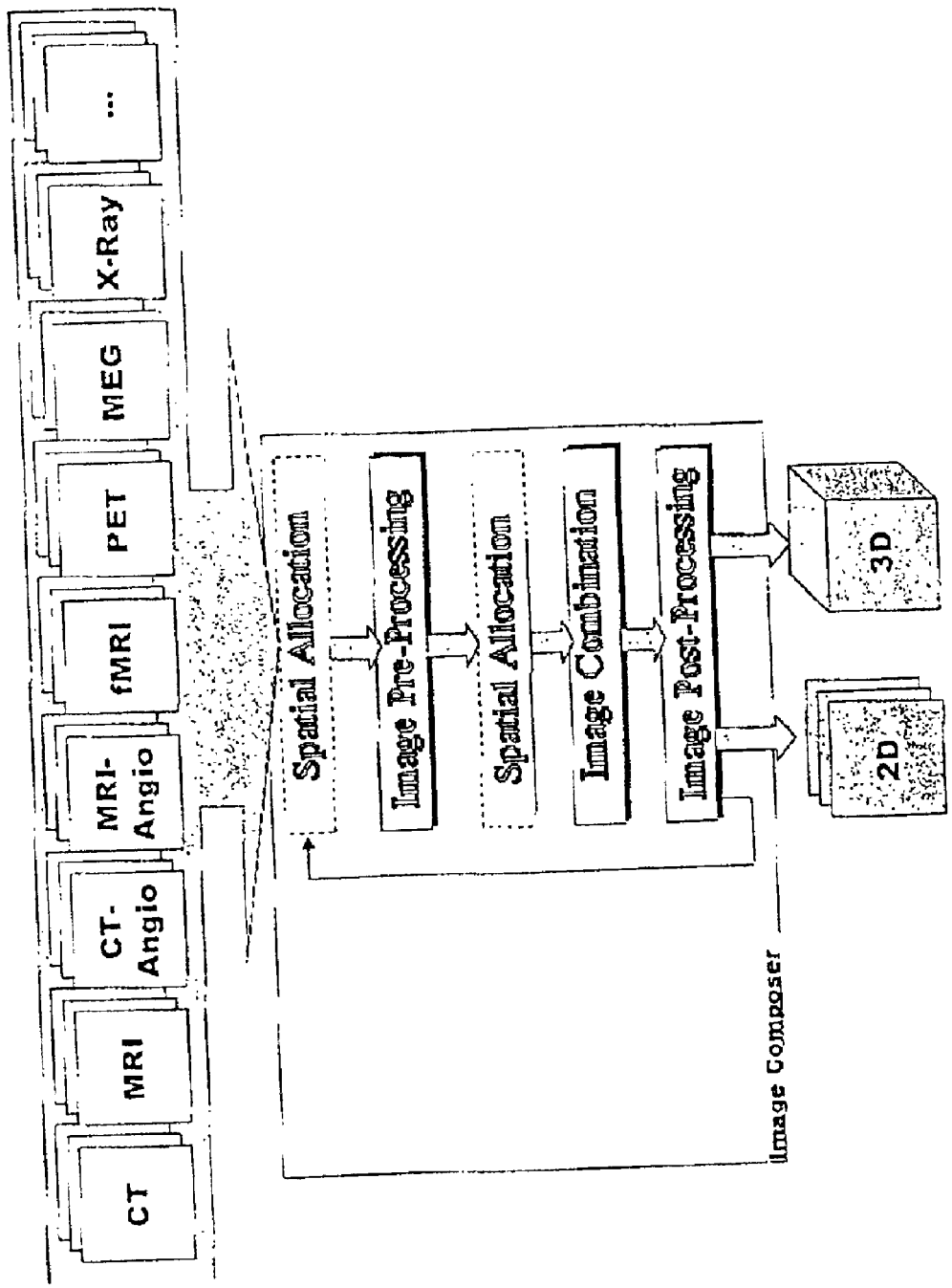
FIG. 1 is a schematic diagram explaining the method and system in accordance with the invention.

FIG. 1 shows a schematic flow diagram explaining the method and system in accordance with the invention. The system 1 comprises an image composer 2, a display unit 6 for displaying two-dimensional slice images or sectional views, as well as a display unit 7 displaying data sets three-dimensionally. The display units 6 and 7 may form a common display unit.

Figure 2:
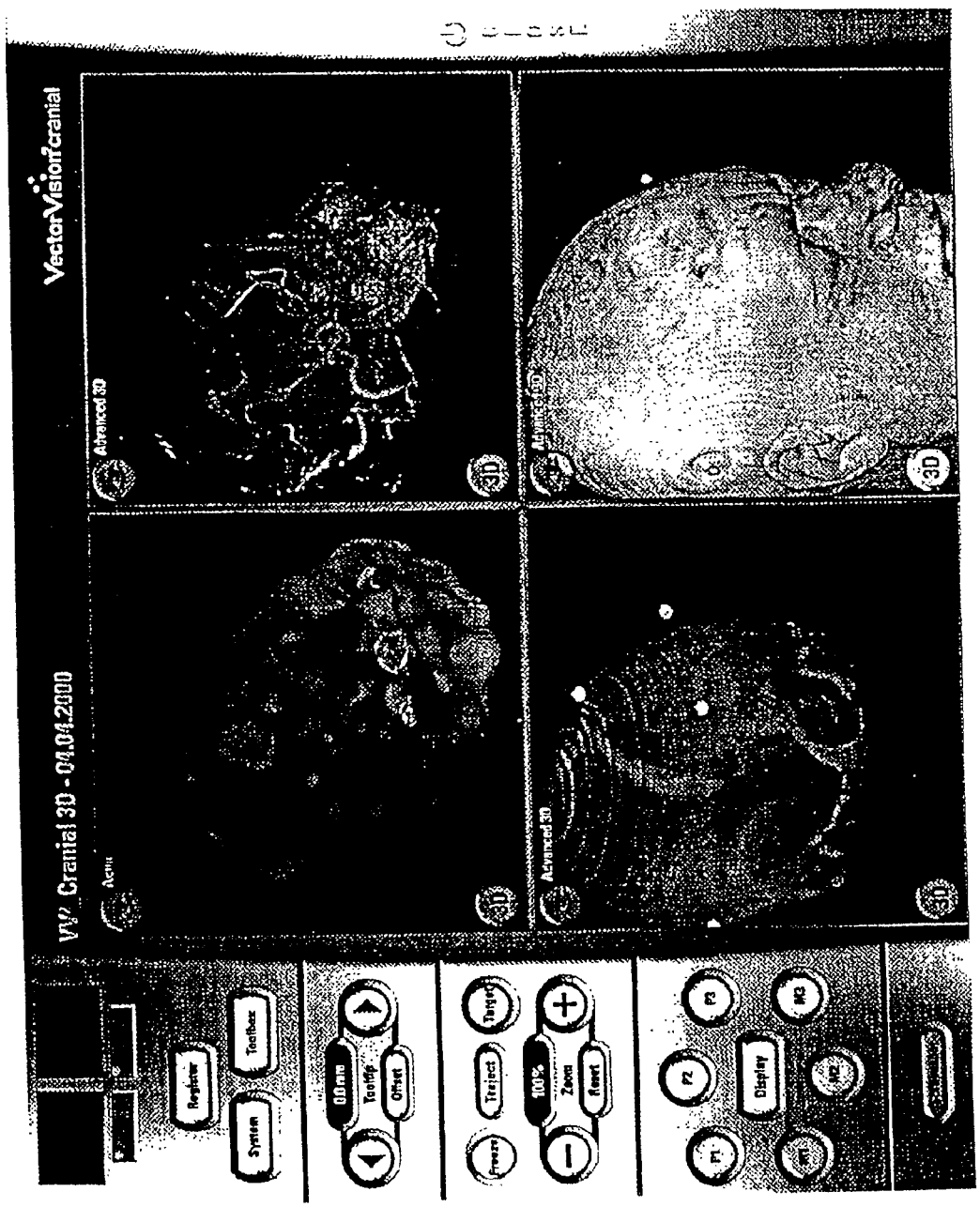
FIG. 2 is an example of a display visualizing synthesized data and selected data sets three-dimensionally and side-by-side.

A number of different diagnostic data sets, captured by various methods of diagnosis, may be inputted into the image composer 2. As shown in FIG. 2, data sets may be captured using a CT method (computer tomography), a CT angiograph method, a magnetic resonance method (MR), an MR angiograph method, a positron emission tomography method (PET), a functional MRI method (fMRI), an x-ray rotational angiograph method, a 3D ultrasound method, MEG (magnetic encephalography), or any other imaging method of medical diagnosis. The different data sets 8 inputted into the image composer 2 may, however, also be derived from one and the same data set by differing methods of image preprocessing, especially for variously highlighting differing tissue structures by means of differing image parameters, each being used for a different selected data set 8.

As indicated in FIG. 1 by the layers of the data sets 8, the input data sets 8 are typically organized in two-dimensional layers, wherein the sum of the 2D layers of each data set represents the body volume to be displayed. For two-dimensional display, axial, sagittal or coronal slices through the body volume are particularly suitable, although input data sets may also be organized differently.

Each data set can be stored in a data storage means (not shown) and retrieved by the image composer 2, for example as selected by the operator. For this purpose, the composer 2 is connected to the data storage means via an interface, a network or a comparable means. At least one of the data sets may, however, also be captured in real time by a diagnostic device.

The image composer 2 comprises a section for spatial allocation R, R', an image combination section 3 and at least one imaging section 5, 5'. Each of the sections is preferably implemented as software. Once selected by an operator or by a computer program running on the image composer 2, the image combination section 3 combines or synthesizes at least two of the data sets 8 in accordance with a definable image combination algorithm. This algorithm realizes a mathematical function which preferably assigns each new data value to the data values of the selected data sets 8 with a corresponding spatial location on a one-to-one basis, as will be described in more detail below by way of an example. The sum of the data values computed in this way forms the synthesized data set. The mathematical function may also combine a number of respective data values of the selected data sets into a single data value of the synthesized data set with a corresponding spatial allocation or relationship. In the simplest case, adding and/or subtracting data values to/from each other of two selected data sets 8 may be employed as the image combination algorithm, or also other image combination algorithms suitable for diagnostic visualization.

In order that the selected data sets may be superimposed with exact positioning, the spatial geometry of the selected data set, and also other parameters, such as for example the zoom factor of each data set, is taken into account, so that the data sets can be captured in various reference systems. Preferably, the selected data sets are spatially arranged precisely with respect to each other. The spatial allocation or relationship R, R' may be rigid, i.e. non-variable. As indicated by the broken line frames, the spatial allocation R, R' may also be elastic, i.e. variable, so that for example distortions occurring in a selected data set 8 (for example in an MRI method) relative to a second selected data set 8 can be corrected prior to or during synthesizing. The spatial allocation R of the data values may be achieved prior to image pre-processing 5 or thereafter (R').

In section 3, the selected data sets 8 are combined with each other by synthesizing the image information or image information derived therefrom, by suitable mathematical functions.

In the image composer 2, at least one of the selected data sets can be subjected to 2D or 3D imaging or image processing, in order for example to highlight tissue structures in the data set particularly well, as will be described in even more detail below by way of FIGS. 3 and 4. For medical diagnostic visualization methods, suitable image processing methods are known. Parameters are required for each of the image processing methods employed. These image processing parameters can be predefined, or defined manually or automatically, as explained below.

Once synthesized, the synthesized data set is displayed in a two-dimensional slice display on the display unit 6, wherein location and orientation of the slice through the body volume may be predefined, for example by a slider, a trackball or plus/minus buttons on a touch screen.

A three-dimensional visualization is also computed from the computed, synthesized data set, and displayed on the display unit 7. This visualization can be rotated in any way in three-dimensional space, for example by menu control, trackball or plus/minus buttons on a touch screen, wherein portions of the body volume may be displayed enlarged or rotated.

As shown schematically in FIG. 1, the display shown on the display unit 6 or 7 comprises image information from each of the selected data sets 8. For example, the image composer 2 may select a CT image and an MR image. The CT image can in principle provide a particularly good resolution of the bone structure, in the present case of a skull. The magnetic resonance image (MR) in principle provides good resolution of the brain structure, and where necessary of the vascular structure too, but not of the bone structure. The synthesized data set thus simultaneously comprises image information relating to the bone structure, the vascular structure and the brain structure. If a PET image is additionally selected, with which metabolically active areas in particular may be visualized, these areas may also be displayed in the synthesized data set. For synthesizing the data set, the selected data sets may be added, for example with predefined weighting or opacity and/or color rendering of the selected data sets, as will be described more exactly below.

For synthesizing the data set, each of in the simplest case two selected data sets may also be subtracted from one another. When, for example, a data set captured by means of an MR method is subtracted from a data set captured by an MR angiograph method, brain structures can be practically eliminated from the image, excepting the vascular structure. This may necessitate a suitable weighting of the respective selected data sets, or a suitable image processing of the selected data sets, as detailed below.

A mixed data set may also be displayed on the display unit 7, said data set representing a three-dimensional partial slice through a synthesized data set, for example the bone or skin structure of a human cranium, wherein the upper part of the cranium is displayed cut away and this partial slice and the synthesized data set are superimposed, for example the three-dimensional vascular structure in the human cranium, projecting three-dimensionally through the human cranium, out from the slice plane.

To enhance the information content of the synthesized data set, at least one of the selected data sets 8 may be subjected to image processing 5, 5' to effectively highlight those structures contained in the selected data set which can be captured particularly well by the method used for capturing the selected data set. It is preferred to subject all selected data sets from image synthesis to image processing 5. For this purpose, preset parameters may be used which are known to be typically suitable for displaying data sets captured with the aid of the methods of diagnosis employed. However, the parameters may also be determined manually or automatically.

For methods of medical visualization, various parameters particularly suited to highlighting details in the display of images are known. These are typically parameters influencing the color and opacity assignment of the intensity values of the data sets. A few examples of preferred parameters are cited in the following. A threshold value, for example, may be set by the parameter, such that pixels whose value exceeds the threshold value are displayed bright and/or colored, and pixels whose data value does not reach the threshold value are displayed with a constant color or brightness, for example in black alone. A color and/or brightness gradient may also be influenced by the parameter, in order to scale the data values. The opacity or transparency of the image data values of a selected data set may also be influenced by the parameter, such that in a first data set displayed semi-transparent, three-dimensionally representing a brain structure for example, a second set is recognizable, representing for example the vascular structure in the brain structure. The parameter may also influence the color used to display a synthesized data set or a selected data set. Further image processing parameters are known from the prior art.

To define the image processing parameter manually, a slice image is displayed by a selected data set on the display unit 6 as shown in FIG. 1, wherein the three-dimensional location and orientation of the slice image may be predefined by means of operating elements. By means of a parameter setting device, schematically indicated by the reference symbol I, one or more image processing parameters are modified until the slice image shown on the display unit 6 or the three-dimensional display on the display unit 7 exhibits the desired resolution and image information. This will now be explained with reference to FIGS. 3 and 4. To establish the image processing parameters, the loop L as shown in FIG. 1 can be run through a number of times. Once the image processing parameters have been defined manually, the body volume is visualized three-dimensionally on the display unit 7 as shown in FIG. 1, by using the defined image processing parameters. Alternatively, the image processing parameters may also be defined directly by way of the three-dimensional visualization on the display unit 7 which, however, necessitates as a rule a greater computation time. The synthesized data sets thus obtained may be stored separately or together with the selected data sets and/or supplementarily with all of the captured data sets.

Figure 5:
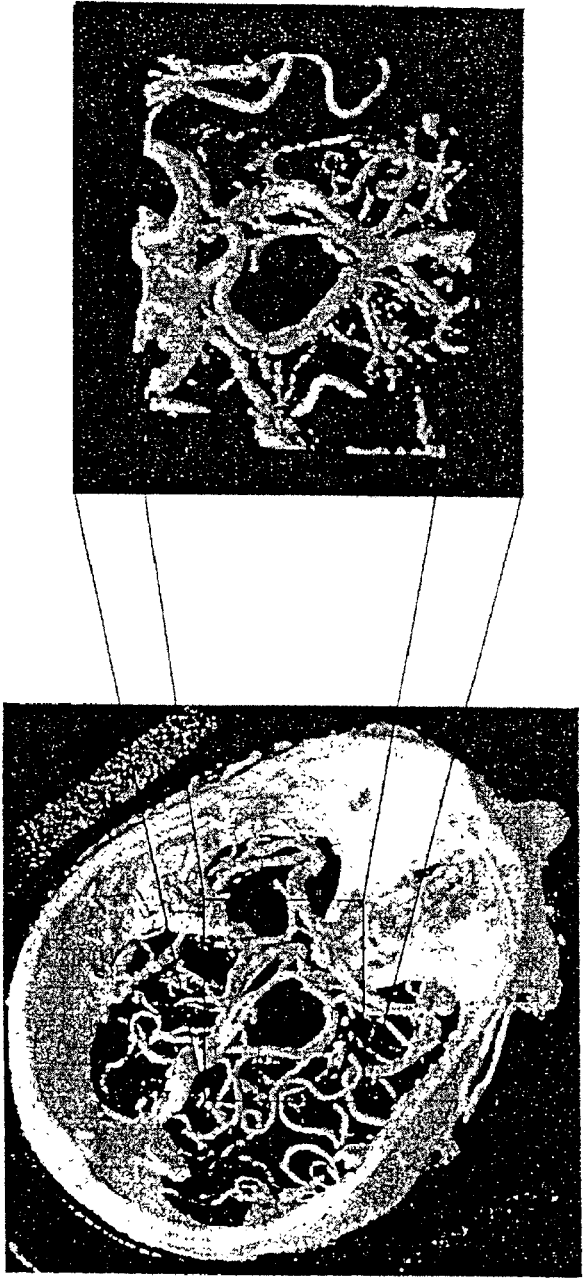
FIG. 5 is a three-dimensional visualization of a synthesized data set, as well as an enlarged view of a portion thereof.

FIG. 2 illustrates a preferred example of a 3D display on the display unit 7. The 3D display 10 as shown in FIG. 2 comprises four image segments 12 in the right-hand portion of the image, in each of which three-dimensional visualizations are displayed which can be spatially rotated or enlarged, together or independently of each other. As shown in FIG. 2, PET data are displayed three-dimensionally in the left-hand upper segment of the image, image data captured by MR angiograph methodology in the right-hand upper segment, CT image data in the left-hand lower segment, and MR image data in the right-hand lower segment. The display unit 7 additionally comprises a segment for three-dimensional visualization of a synthesized data set as shown in FIG. 5.

A control panel 11 is arranged in the left-hand portion of the window, as shown in FIG. 2, and includes a number of control elements, for example, sliders or buttons on a touch screen, for setting the processing and manipulating of the image, and recording of the data.

FIGS. 3 and 4 illustrate the 2D display unit 6 and 6' respectively, including a window and an operator surface for defining image processing parameters, in particular in the context of image processing 5, and for two different image processing parameters in each case. As shown in FIGS. 3 and 4, the window 6, 6' comprises a display 15, 15' for displaying a two-dimensional slice image of the selected data set through the body volume in each case. The image processing parameters which have just been respectively set are used here for displaying, such that they can be optimized by way of the display 15, 15'. With the aid of the slider 16, the spatial location of the slice image in the body volume can be changed. Two buttons 14, 14' are provided in the lower part of the window, for defining the standard settings for the image processing parameter or parameters. A graphic display 13, 13' for visualizing the currently set image processing parameter, and the tools indicated by shiftable rectangles for changing each image processing parameter, are displayed in the left-hand upper part of the window. In the toolbox window 13, the x-axis corresponds to the threshold value and the y-axis to the frequency of the image data values having a specific image density, wherein the image density, for example for CT data, is displayed in Houncefield units.

Figure 3A:
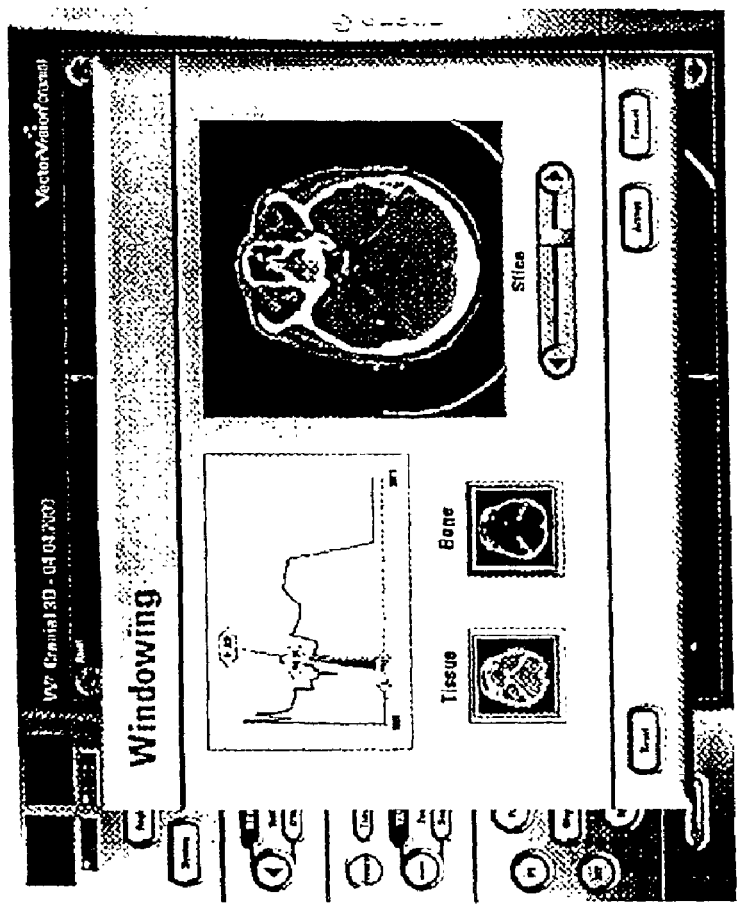
FIGS. 3a,3b show, in two different parameter settings, a window for setting parameters influencing the image display of a selected data set.
Figure 3B:
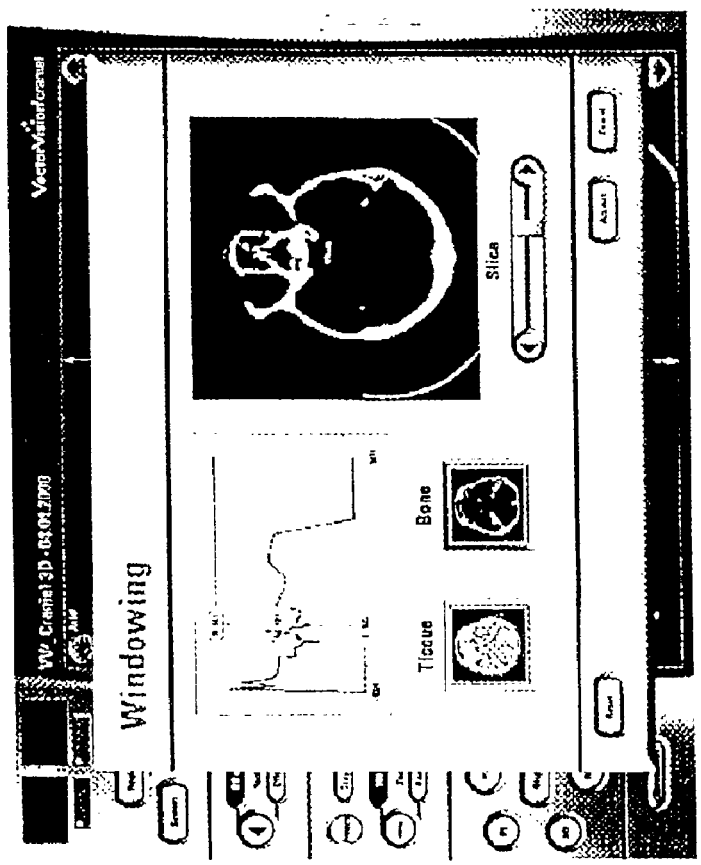

FIG. 3a illustrates a slice image through a CT image, the image processing parameters having been selected so that both bone structures and tissue structures of the skull are recognizable. As can be seen by comparing the displays 15 as shown in FIGS. 3a and 3b, the image gradient, which is converted into brightness levels of the image, is selected less steep for a comparable threshold value in FIG. 3a than in FIG. 3b. Whilst, as shown in FIG. 3a, both bone and tissue structures are recognizable, only bone structures are in practice still recognizable in FIG. 3b. By shifting the respective tools in the graphic display 13, the image processing parameters can be varied until the image shows the desired resolution. To optimize the image processing parameters, the location of the slice image in the body volume may also be varied by shifting the slider 16.

By pressing the buttons "tissue" or "bone", preset image processing parameters can be activated, with which tissue structures or bone structures known from experience may be particularly well highlighted, which is advantageous for example if the previous optimization has not led to the desired result and a defined starting point for a new optimization attempt is to be defined.

Figure 4A:
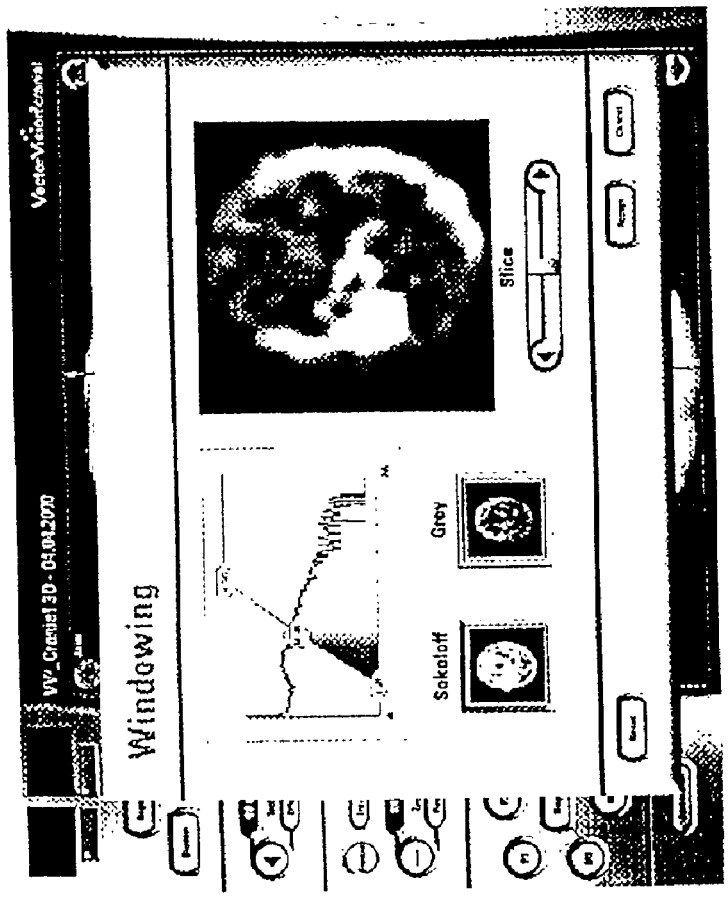
FIGS. 4a,4b show, in two different parameter settings, another window for setting parameters in the image display of another selected data set.
Figure 4B:
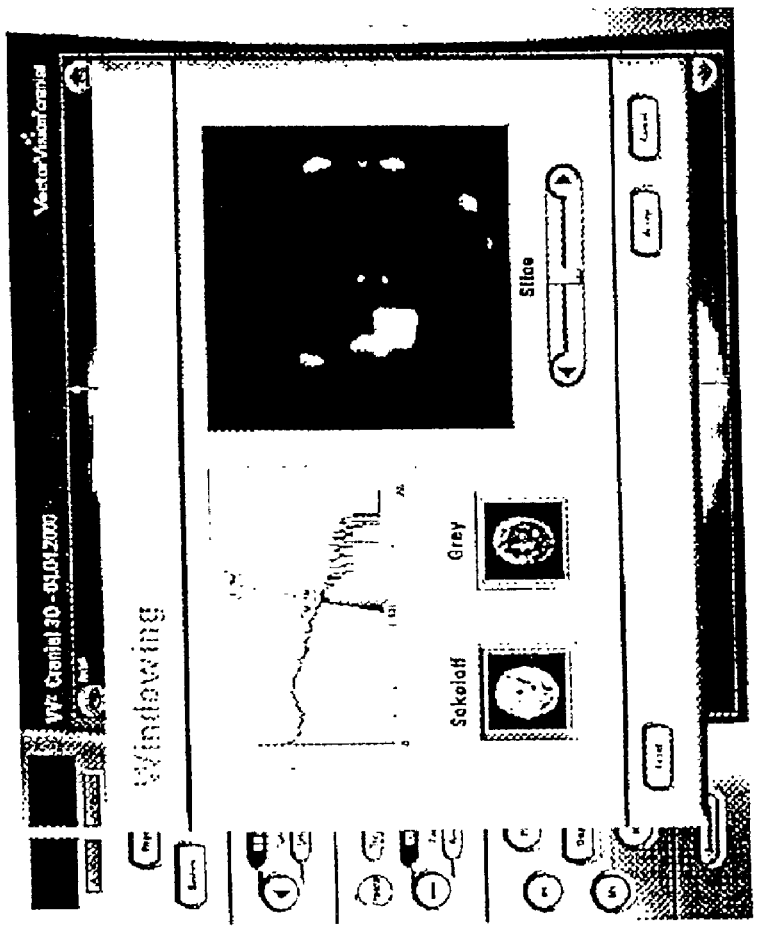

As shown in FIGS. 4a and 4b, a slice image through a PET data set comprising two different image processing parameters is displayed in the window 6'. By shifting the tools in the setting window 13', the desired tissue structures, having enhanced metabolic activity, can be suitably highlighted in the display area 15'.

It is particularly preferred to employ the threshold value mentioned above as follows: for all the pixels of a selected data set which are in a slice display currently being shown on the display 15, 15', the data values—preferably, the intensity—is compared with the currently defined threshold value. If the data value of the respective pixel is below the current threshold value, then nothing is shown in the volume element (voxel) assigned to the pixel, or a background is shown with a constant color rendering and/or intensity, wherein the values for color rendering and intensity are defined. If the data value (e.g. intensity) of the respective pixel is greater than or equal to the threshold value, then a color value and/or intensity value is assigned to the intensity value of the pixel. A comparison table, a defined mathematical function or the like may be used for this assignment.

The slice display is then shown on the display 15, 15' again, i.e. using the previously calculated assignment. The operator can then tell from the display 15, 15' whether or not the currently defined image processing parameters produce a satisfactory image quality, in particular sufficient image contrast, sufficient detail accuracy, etc. If the image quality achieved by the currently selected image processing parameters is not satisfactory, then the operational elements are again shifted by the operator in the setting window 13, 13' and a new display 15, 15' is built up, until the image quality achieved is satisfactory. By pressing the presetting buttons 14, 14', a predefined staring point for a new optimization can thus be defined at any time.

If the image quality of the slice display 15, 15' achieved by means of the currently defined image processing parameters is satisfactory, then by pressing another button, the whole three-dimensional selected data set is pre-processed using the currently defined image processing parameters. This data set is then stored in an intermediate memory, or optionally also transferred directly to the image composer.

Once a selected data set has undergone image pre-processing, information regarding the object and regarding the background is therefore available, i.e. all the pixels whose intensity and/or data value is above the selected threshold value are assigned to a 3-D object and the remaining pixels are assigned to the background, and with a constant color rendering and intensity. For further data compression, pixels which have been assigned a background can be condensed into related regions of the volume.

The aforementioned threshold value procedure is repeated for all the selected data sets which are to be used for image synthesizing. It may be pointed out that the aforementioned threshold value function can of course be linked to another mathematical function. For example, the graduating function defined by forming the threshold value can be linked to a mathematical function having defined image gradients in the vicinity of the threshold value.

The selected data sets pre-processed in this way are synthesized as follows. To describe this, the image synthesis of two selected data sets will be described here by way of an example, without the invention being restricted to this: those intensity values of a first selected data set which are not assigned to a background, i.e. the object image data, are multiplied by a defined transparency T ($0 \leq T \leq 1$). The intensity values of those pixels of the second selected data set which are not assigned to a background are multiplied by a complementary value of the transparency of the first selected data set, i.e. by the factor 1-T. The pixels multiplied respectively by a transparency in this way are then added up pixel-by-pixel, to obtain the data values of the synthesized image data set and/or the synthesized representation.

Thus, in accordance with the invention, not all the pixels of a selected data set are multiplied by a transparency factor, but only those pixels which are not assigned to a background. The detail accuracy of a selected data set resulting from the aforementioned image pre-processing is thus retained in image synthesis. Moreover, image synthesis is less computationally intensive, since as a rule—i.e. when background image data are also available—fewer multiplication and addition steps have be to performed. In addition, memory space can be saved, in particular when the background image data are stored in volumes.

If a background pixel of a first data set and an object pixel of a second data set are present in a volume element of the synthesized representation, then for the synthesized representation, the object pixel is superimposed over a background pixel in the synthesized representation with a defined transparency factor.

The aforementioned image synthesis can of course also be used for synthesis from more than two selected data sets, wherein the more than two selected data sets are each assigned a transparency factor, the sum of the transparency factors preferably assuming a constant value, for example the value 1.

The transparency factor can also vary spatially. For example, a gradient for the transparency in three-dimensional space can be defined or another mathematical function, to thus highlight even more details in the synthesized image data set.

The result of image synthesis can be displayed in two-dimensional slice displays in a definable position and orientation and/or in a three-dimensional representation with a definable position and orientation.

The image processing parameters used to visualize the synthesized data set may also be defined or optimized automatically. In this way, a slice image can be defined on the display unit 6, which displays the image information to be highlighted, for example a bone structure, particularly well. Algorithms are known from prior art for defining the relevant image processing parameters. Optimization may also be achieved in a 3D visualization.

The parameters used for image processing and visualization can be changed at any time, for example during an operation, to adapt to the different steps in surgery.

As shown in FIG. 5, the synthesized data set is visualized three-dimensionally in a segment 12 of the display unit 7, by use of the preset or defined image processing parameters. The display can be rotated and enlarged (window 20) at will in three-dimensional space.

Instead of visualizing different tissue structures three-dimensionally on display unit 7, or two-dimensionally on display unit 6, constant over time, the color or brightness assigned to the various tissue structures can be changed over time, in accordance with a preferred embodiment, such that two different tissue structures can for example be visualized with the same intensity at a first point in time, whereas at a second point in time the two tissue structures are displayed with differing intensities, and at a third point in time one of the tissue structures may be visualized with disappearing intensity, etc., such that the observer can alternately concentrate on different tissue structures. The brightness or intensity on the display unit 6 or 7 can be constantly or incrementally varied, as instructed by the operator.

For implementing the method as described above, a computer program product is also disclosed, comprising software code portions for implementing the aforementioned steps in the method when the software code portions are loaded into the RAM of a digital computer.

The synthesized representation can, in accordance with the present invention, be displayed directly on a display, e.g. used directly for display control. A synthesized data set can, however, also be calculated which is displayed on a display after further processing (e.g. in a graphics card), intermediate storage, or the like.

The present invention is not restricted to the methods of diagnosis cited above for capturing image data sets. In accordance with the present invention, any method of three-dimensional diagnostic visualization may be used, wherein each of the image data sets may be composed and processed in any way, for synthesizing the synthesized data set.

What is claimed is:

1. A method for visualizing a body volume, wherein a data set whose data values represent said body volume is displayed on a display unit two- or three-dimensionally, in which method:
    a synthesized representation is calculated from at least two selected diagnostic data sets which are not identical and have a predefined spatial allocation with respect to each other, wherein
    each of said data values of said synthesized representation is calculated as a mathematical function of at least one data value of each of said selected data set, and said synthesized representation is displayed on the display unit, wherein it is established by way of a criterion for each pixel of a selected data set whether said pixel is assigned to an image background or not, and those pixels which are assigned to an image background are not taken into account when calculating the synthesized representation.

2. The method as set forth in claim 1, wherein said criterion is a threshold value and those pixels of a selected data set whose intensity is below said threshold value are assigned to an image background.

3. The method as set forth in claim 1, wherein for calculating the synthesized representation, the data value of each pixel of a selected data set is multiplied by a factor and the data value of an assigned pixel of another selected data set is multiplied by a complementary factor.

4. The method as set forth in claim 1, wherein said at least two selected data sets are selected from data sets, each of which is captured by a different method of diagnosis.

5. The method as set forth in claim 1, wherein at least two of said selected data sets are calculated by different image processing means using different image processing parameters from one and the same original data set captured by a method of diagnosis.

6. The method as set forth in claim 1, wherein said selected data sets are inputted to a data processing means.

7. The method as set forth in claim 1, wherein image processing is carried out to synthesize said synthesized representation.

8. The method as set forth in claim 1, wherein said synthesized representation is derived by at least one of subtracting and adding two selected data sets, respectively.

9. The method as set forth in claim 7, wherein image processing is carried out by means of at least one parameter influencing at least one of the color and the opacity allocation of the intensity values of said data sets.

10. The method as set forth in claim 9, wherein the result of said image processing is visualized as a predefined two-dimensional slice image through said body volume.

11. The method as set forth in claim 1, wherein, in said synthesized representation, different color values are assigned to data from different selected data sets.

12. The method as set forth in claim 11, wherein the display parameters of at least one selected data set in said synthesized representation are varied over time.

13. The method as set forth in claim 1, wherein in addition to said two- or three-dimensional visualization of said synthesized data set, three-dimensional visualizations of at least one of each of said selected data sets and two-dimensional slices through said body volume are displayed on said display unit.

14. The method as set forth in claim 1, wherein said data sets are captured by means of at least one of CT, CT-A, MRI, MR-A, fMRI, PET, MEG, SPECT or ultrasound.

15. The method as set forth in claim 1, wherein, for calculating the synthesized representation, a synthesized data set is calculated which is displayed on said display unit.

16. A computer program product, directly loadable into the RAM of a digital computer, comprising software code portions for implementing the steps of the method as set forth in claim 1, when said product is run on said digital computer.

17. A system for visualizing a body volume, in particular for implementing the method as set forth in claim 1, comprising:
    a) a data processing means for calculating a synthesized representation from at least two selected diagnostic data sets which are not identical and have a predefined spatial allocation with respect to each other, such that each of the data values of said synthesized representation is calculated as a mathematical function of at least one data value of each of said selected data sets; and
    b) a display unit for two- or three-dimensionally displaying said synthesized representation, whose data values represent said body volume,
    c) wherein it is established by way of a criterion for each pixel of a selected data set whether said pixel is assigned to an image background or not, and those pixels which are assigned to an image background are not taken into account when calculating said synthesized representation.

18. The system as set forth in claim 17, wherein said criterion is a threshold value and those pixels of a selected data set whose intensity is below said threshold value are assigned to an image background.

19. The method as set forth in claim 17, wherein for calculating said synthesized representation, the data value of each pixel of a selected data set is multiplied by a factor and the data value of an assigned pixel of another selected data set is multiplied by a complementary factor.

20. The system as set forth in claim 17, including an input means for inputting said selected data sets into the data processing means.

21. The system as set forth in claim 17, including an image processing means for subjecting at least one of said selected data sets and said synthesized representation to image processing.

22. The system as set forth in claim 21, wherein said image processing means is devised to carry out image processing by means of at least one parameter influencing at least one of said color and opacity allocation of said intensity values of said data sets.

23. The system as set forth in claim 17, further comprising at least one of adding and subtracting means, for adding and subtracting two selected data sets, respectively.

24. The system as set forth in claim 17, further comprising a display unit, for displaying a two-dimensional slice image through said body volume for at least one of a selected data set and said synthesized representation.

25. The system as set forth in claim 17, further comprising a display unit, for displaying a three-dimensional visualization of said synthesized representation and three-dimensional visualizations of at least one of said selected data sets and two-dimensional slice images of said synthesized representation and of said selected data sets through said body volume.

26. The system as set forth in claim 17, wherein said input means is connected to at least one of a data memory and to a system for capturing said data sets by means of at least one of CT, CT-A, MRI, MR-A, fMRI, PET, MEG, SPECT or ultrasound.

27. The system as set forth in claim 17, wherein, for calculating said synthesized representation, a synthesized data set is calculated which is displayed on said display unit.

\* \* \* \* \*